(12) United States Patent
Zhou et al.

(10) Patent No.: US 10,803,557 B2
(45) Date of Patent: Oct. 13, 2020

(54) NON-UNIFORMITY CORRECTION METHOD FOR INFRARED IMAGE BASED ON GUIDED FILTERING AND HIGH-PASS FILTERING

(71) Applicant: XIDIAN UNIVERSITY, Xi'an, Shaanxi (CN)

(72) Inventors: Huixin Zhou, Shaanxi (CN); Dong Zhao, Shaanxi (CN); Runda Qian, Shaanxi (JP); Xiuping Jia, Shaanxi (CN); Jun Zhou, Shaanxi (CN); Hanlin Qin, Shaanxi (CN); Bo Yao, Shaanxi (CN); Yue Yu, Shaanxi (CN); Huan Li, Shaanxi (CN); Jiangluqi Song, Shaanxi (CN); Bingjian Wang, Shaanxi (CN); Yangqun Jin, Shaanxi (CN); Shenghui Rong, Shaanxi (CN); Kuanhong Cheng, Shaanxi (CN); Kun Qian, Shaanxi (CN)

(73) Assignee: XIDIAN UNIVERSITY, Xi'an (CN)

( * ) Notice: Subject to any disclaimer, the term of this patent is extended or adjusted under 35 U.S.C. 154(b) by 78 days.

(21) Appl. No.: 16/338,703

(22) PCT Filed: Dec. 26, 2017

(86) PCT No.: PCT/CN2017/118768
§ 371 (c)(1),
(2) Date: Apr. 2, 2019

(87) PCT Pub. No.: WO2019/127059
PCT Pub. Date: Jul. 4, 2019

(65) Prior Publication Data
US 2020/0143517 A1    May 7, 2020

(51) Int. Cl.
*G06K 9/00* (2006.01)
*H04N 5/00* (2011.01)
(Continued)

(52) U.S. Cl.
CPC ............... *G06T 5/002* (2013.01); *G06T 5/20* (2013.01); *G06T 2207/10016* (2013.01); *G06T 2207/10048* (2013.01)

(58) Field of Classification Search
USPC ....... 382/100, 103, 106, 154–155, 162, 168, 382/173, 191, 199, 210, 224, 232, (Continued)

(56) References Cited

U.S. PATENT DOCUMENTS 9,924,116 B2 * 3/2018 Chahine ............. H04N 5/23241
10,015,425 B2 * 7/2018 Saragaglia ............... H04N 3/09
(Continued)

*Primary Examiner* — Seyed H Azarian

(57) ABSTRACT

A non-uniformity correction method for an infrared image based on guided and high-pass filtering includes: assigning high-frequency component of first image frame of original image sequence to first fixed pattern noise $f_1$; successively loading N-th image frame of the original image sequence with non-uniformity as current image frame, determining a difference between the current image frame and (N−1)-th image frame to obtain (N−1)-th differential image frame, and obtaining a relative change amplitude of each image element of (N−1)-th image frame according to the (N−1)-th differential image frame; and performing high-pass filtering based on a combination of a high-frequency component of the current image frame obtained through guided filtering and the relative change amplitude to obtain n-th fixed pattern noise $f_n$, and performing non-uniformity correction on the current image frame according to $f_n$ to obtain a correction result of the current image frame, where N≥2, n≥2.

13 Claims, 5 Drawing Sheets

(51) Int. Cl.
*G06T 5/00* (2006.01)
*G06T 5/20* (2006.01)

(58) Field of Classification Search
USPC ............... 382/254–264, 274, 276, 286, 305;
348/606, 607, 614, 618
See application file for complete search history.

(56) References Cited

U.S. PATENT DOCUMENTS

| | | |
|---|---|---|
| 10,111,594 B2 * | 10/2018 | Hielscher ............. A61B 5/6807 |
| 2019/0318463 A1 * | 10/2019 | Zhang ....................... G06T 5/10 |
| 2019/0339688 A1 * | 11/2019 | Cella .................. G05B 19/4185 |

* cited by examiner

NON-UNIFORMITY CORRECTION METHOD FOR INFRARED IMAGE BASED ON GUIDED FILTERING AND HIGH-PASS FILTERING

TECHNICAL FIELD

The disclosure relates to the field of infrared image processing, and in particular to a non-uniformity correction method for an infrared image based on guided filtering and high-pass filtering.

BACKGROUND

An infrared focal plane array is a core component of a modern infrared imaging system. Due to its advantages such as small size, light weight, no need for refrigeration equipment and the like, the infrared focal plane array is widely used in fields such as military reconnaissance, forest fire prevention and medical detection. However, due to the limitations from materials and manufacturing processes, even if different image elements are in the same incident radiation conditions, these different image elements of the infrared focal plane array produce different outputs, known as, response non-uniformity. The response non-uniformity generates a fixed pattern noise on an infrared image, which results in serious affections on the imaging quality.

At present, non-uniformity correction method for IR images includes two major categories: calibration method and scene method. The calibration method requires operation to be periodically paused so that re-calibration can be performed to obtain new correction parameters, and thus has poor real-time performance. Therefore, increasing researches are focusing on the scene method in recent years. The scene method estimates scene information and updates correction parameters based on movement of the scene. Furthermore, the correction parameters can be adaptively updated. Typical scene methods include temporal high-pass filtering algorithm, neural network algorithm, constant statistics algorithm, Kalman filtering algorithm, and inter-frame registration algorithm.

Due to complicated algorithms, the scene method consumes a relatively long time. Furthermore, in cases where a stationary target suddenly starts moving and a moving target suddenly stops, the scene method may make an erroneous estimation of the correction parameters, thereby generating the ghost phenomenon.

SUMMARY

In view of the above, the disclosure is intended to provide a non-uniformity correction method for an infrared image based on guided filtering and high-pass filtering.

To this end, the technical solutions of the disclosure are implemented as follows.

Embodiments of the disclosure provide a non-uniformity correction method for an infrared image based on guided filtering and high-pass filtering, including: performing guided filtering on a first image frame of an input original image sequence with non-uniformity to obtain a high-frequency component of the first image frame of the original image sequence, and assigning the high-frequency component of the first image frame of the original image sequence to a first fixed pattern noise $f_1$; successively loading an N-th image frame of the original image sequence with non-uniformity as a current image frame, determining a difference between the current image frame and an (N−1)-th image frame of the original image sequence with non-uniformity to obtain an (N−1)-th differential image frame, and obtaining a relative change amplitude of each image element of the (N−1)-th image frame according to the (N−1)-th differential image frame; and performing high-pass filtering based on a combination of a high-frequency component of the current image frame obtained through guided filtering and the relative change amplitude of each image element of the (N−1)-th image frame to obtain an n-th fixed pattern noise $f_n$, and performing non-uniformity correction on the current image frame according to the n-th fixed pattern noise $f_n$ to obtain a correction result of the current image frame, where N≥2, n≥2.

According to an embodiment, the method may further include: after performing non-uniformity correction on the current image frame according to the n-th fixed pattern noise $f_n$ to obtain the correction result of the current image frame, determining whether the current image frame is the last image frame of the original image sequence with non-uniformity, if it is the last image frame, stopping the correction, and if it is not the last image frame, continuing to correct subsequent image frames.

According to an embodiment, performing guided filtering on the first image frame of the input original image sequence with non-uniformity to obtain the high-frequency component of the first image frame of the original image sequence, and assigning the high-frequency component of the first image frame of the original image sequence to the first fixed pattern noise $f_1$ may be implemented through steps of:

(101) reading the first image frame of the original image sequence with non-uniformity;

(102) performing guided filtering on the first image frame of the original image sequence with non-uniformity to obtain a low-frequency component of the first image frame of the original image sequence;

(103) subtracting the low-frequency component of the first image frame of the original image sequence from the first image frame of the original image sequence with non-uniformity to obtain the high-frequency component of the first image frame of the original image sequence; and (104) assigning the high-frequency component of the first image frame of the original image sequence to the first fixed pattern noise $f_1$.

According to an embodiment, successively loading the N-th image frame of the original image sequence with non-uniformity as the current image frame, and determining the difference between the current image frame and the (N−1)-th image frame of the original image sequence with non-uniformity to obtain the (N−1)-th differential image frame may be implemented through steps of:

(201) successively loading the N-th image frame of the original image sequence with non-uniformity as the current image frame;

(202) performing guided filtering on the current image frame to obtain a low-frequency component of the current image frame;

(203) subtracting the low-frequency component of the current image frame from the current image frame to obtain the high-frequency component of the current image frame; and (204) calculating a difference between the current image frame and the (N−1)-th image frame as the (N−1)-th differential image frame.

According to an embodiment, obtaining the relative change amplitude of each image element of the (N−1)-th image frame according to the (N−1)-th differential image frame may include: determining the relative change amplitude of each image element of the (N−1)-th image frame according to the following formula:

$$q_{n-1}(i, j) = \frac{d_{n-1}(i, j)}{x_{n-1}(i, j)}$$

where $q_{n-1}(i, j)$ denotes a relative change amplitude of an image element at row i and column j of the (N−1)-th image frame, $d_{n-1}(i, j)$ denotes a grey scale value of an image element at row i and column j of the (N−1)-th differential image frame, and $x_{n-1}(i, j)$ denotes a grey scale value of the image element at row i and column j of the (N−1)-th image frame.

According to an embodiment, performing high-pass filtering based on the combination of the high-frequency component of the current image frame obtained through guided filtering and the relative change amplitude of each image element of the (N−1)-th image frame to obtain the n-th fixed pattern noise $f_n$ may include: determining the n-th fixed pattern noise $f_n$ according to the following formula:

$$f_n(i, j) = \begin{cases} \frac{1}{M_{min}} x_H^n(i, j) + \left(1 - \frac{1}{M_{min}}\right) f_{n-1}(i, j) & (q_{n-1}(i, j) > Th) \\ \frac{1}{M_{max}} x_H^n(i, j) + \left(1 - \frac{1}{M_{max}}\right) f_{n-1}(i, j), & (q_{n-1}(i, j) < Th) \end{cases}$$

where $f_n(i, j)$ denotes a grey scale value of an image element at row i and column j of the n-th fixed pattern noise fn, $M_{min}$ denotes a relatively small time constant of temporal high-pass filtering, $M_{max}$ denotes a relatively great time constant of temporal high-pass filtering, $x_H^n(i, j)$ denotes a grey scale value of an image element at row i and column j of the high-frequency component of the current image frame, $f_{n-1}(i, j)$ denotes a grey scale value of an image element at row i and column j of an (N−1)-the fixed pattern noise, $q_{n-1}(i, j)$ denotes a relative change amplitude of an image element at row i and column j of the (N−1)-th image frame, Th denotes a threshold value with $0.1 \leq Th \leq 0.3$.

According to an embodiment, performing non-uniformity correction on the current image frame according to the n-th fixed pattern noise $f_n$ to obtain the correction result of the current image frame may include: performing non-uniformity correction on the current image frame according to $y_n = I_n - f_n$ to obtain the correction result of the current image frame, where $y_n$ denotes the correction result of the current image frame, $I_n$ denotes the current image frame, and $f_n$ denotes the n-th fixed pattern noise with $n \geq 2$.

According to an embodiment, performing guided filtering on the first image frame of the original image sequence with non-uniformity and performing guided filtering on the current image frame may be implemented through steps of:

(301) determining a guided filtering multiplicative parameter $a_k$ and a guided filtering additive parameter $b_k$ according to the following formulas:

$$a_k = \frac{\frac{1}{|w|} \sum_{z \in w_k} I_z p_z - u_k \overline{p}_k}{\sigma_k^2 + \varepsilon}$$

$$b_k = \overline{p}_k - a_k u_k$$

where $w_k$ denotes a window centering on a k-th image element, $|w|$ is a total number of image elements in $w_k$, z denotes a sequence number of an image element in $w_k$, $I_z$ denotes a grey scale value of a z-th image element in an original image, $p_z$ denotes a grey scale value of a z-th image element in a guided image, $u_k$ and $\sigma_k$ respectively denotes an average value and a standard deviation of the original image in $w_k$, $\overline{p}_k$ is an average value of p in $w_k$, $\varepsilon$ is a very small positive number that is equal to 0.01.

(302) determining an average value $\overline{a}_z$ of the guided filtering multiplicative parameter and an average value $\overline{b}_z$ of the guided filtering additive parameter according to the following formulas:

$$\overline{a}_z = \frac{1}{|w|} \sum_{k \in w_z} a_k$$

$$\overline{b}_z = \frac{1}{|w|} \sum_{k \in w_z} b_k.$$

(303) determining an image $x_L$ subjected to guided filtering according to the following formula:

$$x_L = \overline{a}_z I_z + \overline{b}_z.$$

Compared to prior arts, embodiments of the disclosure have beneficial effects as follows.

Firstly, since the high-frequency component of the image can be effectively separated by the guided filtering algorithm of the disclosure, it is possible to overcome the problem in existing techniques that high residual non-uniformity is resulted from the inaccuracy and incomplete separation of the high-frequency components and thus ghost phenomenon is generated, so that subsequent motion-based temporal high-pass filtering can be effectively performed in the technical solutions of the disclosure.

Secondly, motion determination is performed on two adjacent frames of original images using the inter-frame difference algorithm to find the motion region and the static region. Then, a relatively small time constant is used for temporal high-pass filtering of the corresponding motion region of the difference image, the corresponding static region is filtered using a relatively great time constant, and the processed difference image contains less edge and detail information. It is thus possible to overcome problems of incomplete removal of the fixed pattern noise and blurred edges caused by the use of the fixed time constant in the prior art, so that in the technical solutions of the disclosure, edge and detail information of the image can be retained while the fixed pattern noise is removed.

DETAILED DESCRIPTION

In order to make objectives, technical solutions and advantages of the disclosure more clear, the disclosure will be further elaborated below in combination with the accompanying drawings and embodiments. It should be understood that the specific embodiments are only used to interpret the disclosure instead of limiting the disclosure.

Figure 1:
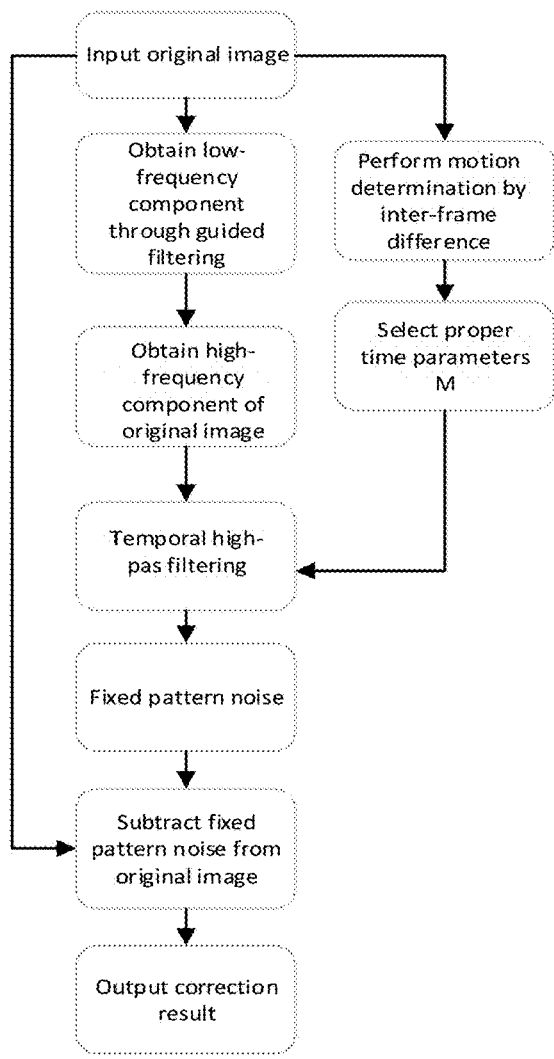
FIG. 1 is a flow chart of the method according to an embodiment of the disclosure.

In view of the above, the disclosure is intended to provide a non-uniformity correction method for an infrared image based on guided filtering and high-pass filtering. As shown in FIG. 1, the method includes steps as follows.

In step 1, a first image frame of an original image sequence with non-uniformity is read.

Figure 2:
FIG. 2 shows a first image frame of an original image sequence with non-uniformity according to an embodiment of the disclosure.

Specifically, FIG. 2 shows a first image frame of an original image sequence with non-uniformity according to an embodiment of the disclosure. The original image sequence with non-uniformity includes 700 image frame, and each image frame has a size of 292×200 pixels. As can be seen from FIG. 2, the original image has apparent fixed pattern noises.

In step 2, guided filtering is performed on the first image frame of the original image sequence with non-uniformity to obtain a low-frequency component of the first image frame of the original image sequence.

Specifically, the guided filtering has the following steps.

In step 201, a guided filtering multiplicative parameter $a_k$ and a guided filtering additive parameter $b_k$ are determined according to the following formulas:

$$a_k = \frac{\frac{1}{|w|}\sum_{z \in w_k} I_z p_z - u_k \overline{p}_k}{\sigma_k^2 + \varepsilon}$$

$$b_k = \overline{p}_k - a_k u_k$$

where $w_k$ denotes a window centering on a k-th image element, $|w|$ is a total number of image elements in $w_k$, z denotes a sequence number of an image element in $w_k$, $I_z$ denotes a grey scale value of a z-th image element in an original image, $p_z$ denotes a grey scale value of a z-th image element in a guided image, $u_k$ and $\sigma_k$ respectively denotes an average value and a standard deviation of the original image in $w_k$, $\overline{p}_k$ is an average value of p in $w_k$, $\varepsilon$ is a very small positive number that is equal to 0.02.

In step 202, an average value $\overline{a}_z$ of the guided filtering multiplicative parameter and an average value $\overline{b}_z$ of the guided filtering additive parameter are determined according to the following formulas:

$$\overline{a}_z = \frac{1}{|w|}\sum_{k \in w_z} a_k$$

$$\overline{b}_z = \frac{1}{|w|}\sum_{k \in w_z} b_k.$$

In step 203, an image $x_L$ subjected to guided filtering is determined according to the following formula:

$$x_L = \overline{a}_z I_z + \overline{b}_z.$$

Figure 3:
FIG. 3 is an exemplary image showing a low-frequency component after guided filtering is performed on a first image frame of an original image sequence with non-uniformity according to embodiment of the disclosure.

Specifically, FIG. 3 is an exemplary image showing a low-frequency component after guided filtering is performed on a first image frame of an original image sequence with non-uniformity according to embodiment of the disclosure. As can be seen from FIG. 3, since the guided filtering algorithm is used, the high-frequency noises in the image are suppressed while edge information of the image is retained. But details and edges of the person in the image have a blurred effect.

In step 3, the low-frequency component of the first image frame of the original image sequence is subtracted from the first image frame of the original image sequence with non-uniformity to obtain the high-frequency component of the first image frame of the original image sequence.

Figure 4:
FIG. 4 is an exemplary image showing a high-frequency component after guided filtering is performed on a first image frame of an original image sequence with non-uniformity according to embodiment of the disclosure.

Specifically, FIG. 4 is an exemplary image showing a high-frequency component after guided filtering is performed on a first image frame of an original image sequence with non-uniformity according to embodiment of the disclosure. As can be seen from FIG. 4, the image includes a plenty of detail information and edges.

In step 4, the high-frequency component of the first image frame of the original image sequence is assigned to the first fixed pattern noise $f_1$.

In step 5, the N-th image frame of the original image sequence with non-uniformity is successively loaded as the current image frame.

Figure 5:
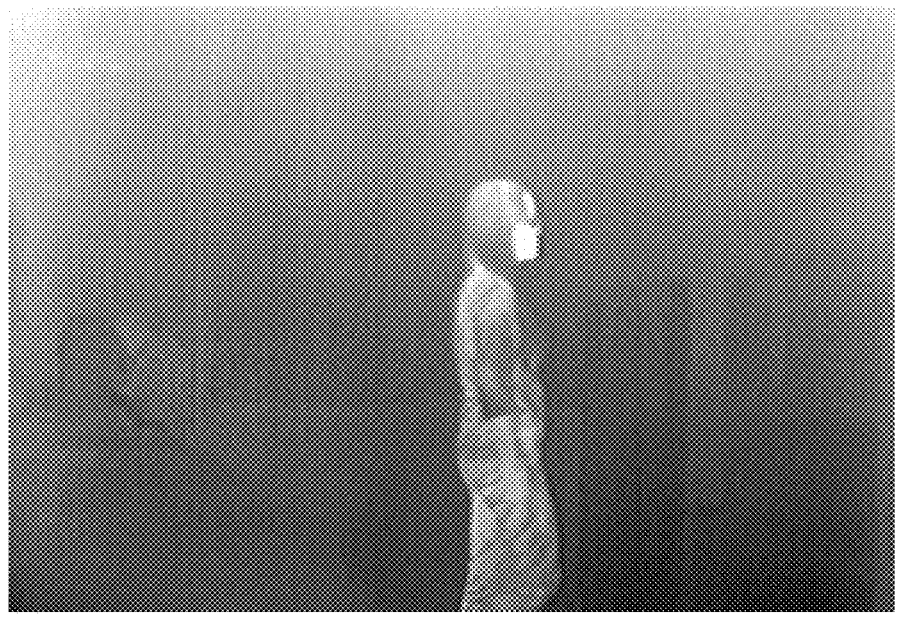
FIG. 5 is an exemplary image showing a 700-th image frame of the original image sequence with non-uniformity according to an embodiment of the disclosure.

Specifically, FIG. 5 is an exemplary image showing a 700-th image frame of the original image sequence with non-uniformity according to an embodiment of the disclosure.

In step 6, guided filtering is performed on the current image frame to obtain a low-frequency component of the current image frame.

Specifically, the guided filtering has the following steps.

In step 601, a guided filtering multiplicative parameter $a_k$ and a guided filtering additive parameter $b_k$ are determined according to the following formulas:

$$a_k = \frac{\frac{1}{|w|}\sum_{z \in w_k} I_z p_z - u_k \overline{p}_k}{\sigma_k^2 + \varepsilon}$$

$$b_k = \overline{p}_k - a_k u_k$$

where $w_k$ denotes a window centering on a k-th image element, $|w|$ is a total number of image elements in $w_k$, z denotes a sequence number of an image element in $w_k$, $I_z$ denotes a grey scale value of a z-th image element in an original image, $p_z$ denotes a grey scale value of a z-th image element in a guided image, $u_k$ and $\sigma_k$ respectively denotes an average value and a standard deviation of the original image in $w_k$, $\bar{p}_k$ is an average value of p in $w_k$, ε is a very small positive number that is equal to 0.02.

In step 602, an average value $\bar{a}_z$ of the guided filtering multiplicative parameter and an average value $\bar{b}_z$ of the guided filtering additive parameter are determined according to the following formulas:

$$\bar{a}_z = \frac{1}{|w|} \sum_{k \in w_z} a_k$$

$$\bar{b}_z = \frac{1}{|w|} \sum_{k \in w_z} b_k$$

In step 603, an image $x_L$ subjected to guided filtering is determined according to the following formula:

$$x_L = \bar{a}_z I_z + \bar{b}_z.$$

Figure 6:
FIG. 6 is an exemplary image showing a low-frequency component after guided filtering is performed on a 700-th image frame of an original image sequence with non-uniformity according to embodiment of the disclosure.

Specifically, FIG. 6 is an exemplary image showing a low-frequency component after guided filtering is performed on a 700-th image frame of an original image sequence with non-uniformity according to embodiment of the disclosure.

In step 7, the low-frequency component of the current image frame is subtracted from the current image frame to obtain the high-frequency component of the current image frame.

Figure 7:
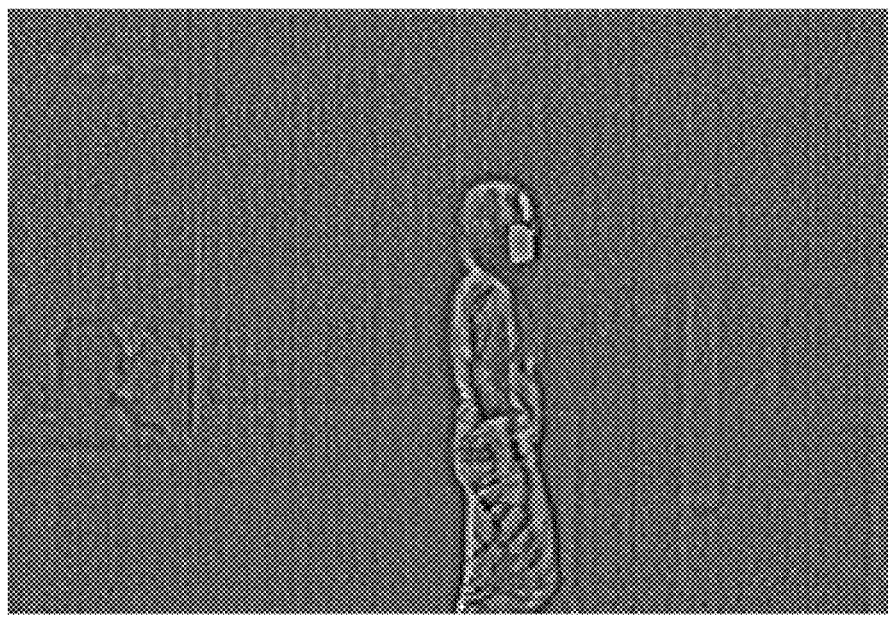
FIG. 7 is an exemplary image showing a high-frequency component after guided filtering is performed on a 700-th image frame of an original image sequence with non-uniformity according to embodiment of the disclosure.

Specifically, FIG. 7 is an exemplary image showing a high-frequency component after guided filtering is performed on a 700-th image frame of an original image sequence with non-uniformity according to embodiment of the disclosure.

In step 8, a difference between the current image frame and the (N−1)-th image frame is calculated as the (N−1)-th differential image frame.

In step 9, a relative change amplitude of each image element of the (N−1)-th image frame is calculated according to the following formula:

$$q_{n-1}(i, j) = \frac{d_{n-1}(i, j)}{x_{n-1}(i, j)}$$

where $q_{n-1}(i, j)$ denotes a relative change amplitude of an image element at row i and column j of the (N−1)-th image frame, $d_{n-1}(i, j)$ denotes a grey scale value of an image element at row i and column j of the (N−1)-th differential image frame, and $x_{n-1}(i, j)$ denotes a grey scale value of the image element at row i and column j of the (N−1)-th image frame.

In step 10, the n-th fixed pattern noise $f_n$ is determined according to the following formula:

$$f_n(i,j) = \begin{cases} \frac{1}{M_{min}} x_H^n(i,j) + \left(1 - \frac{1}{M_{min}}\right) f_{n-1}(i,j), & (q_{n-1}(i,j) > Th) \\ \frac{1}{M_{max}} x_H^n(i,j) + \left(1 - \frac{1}{M_{max}}\right) f_{n-1}(i,j), & (q_{n-1}(i,j) < Th) \end{cases}$$

where $f_n(i, j)$ denotes a grey scale value of an image element at row i and column j of the n-th fixed pattern noise fn, $M_{min}$ denotes a relatively small time constant of temporal high-pass filtering, $M_{max}$ denotes a relatively great time constant of temporal high-pass filtering, $x_H^n(i, j)$ denotes a grey scale value of an image element at row i and column j of the high-frequency component of the current image frame, $f_{n-1}(i, j)$ denotes a grey scale value of an image element at row i and column j of an (N−1)-the fixed pattern noise, $q_{n-1}(i, j)$ denotes a relative change amplitude of an image element at row i and column j of the (N−1)-th image frame, Th denotes a threshold value with $0.1 \leq Th \leq 0.3$.

Figure 8:
FIG. 8 is an exemplary image showing a fixed pattern noise of a 700-th image frame of the original image sequence with non-uniformity, which is obtained through temporal high-pass filtering based on motion determination, according to an embodiment of the disclosure.

Specifically, FIG. 8 is an exemplary image showing a 700-th image frame of the original image sequence with non-uniformity according to an embodiment of the disclosure.

In step 11, non-uniformity of the current image frame is corrected according to the following formula to obtain the correction result of the current image frame:

$$y_n = I_n - f_n$$

where $y_n$ denotes the correction result of the current image frame, $I_n$ denotes the current image frame, and $f_n$ denotes the n-th fixed pattern noise.

Figure 9:
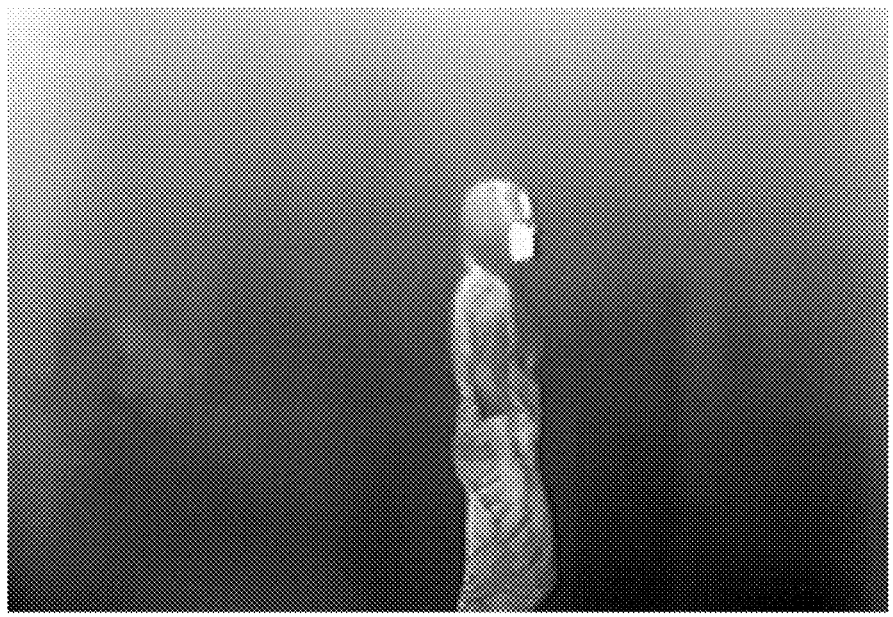
FIG. 9 is an exemplary image showing a correction result of a 700-th image frame of the original image sequence with non-uniformity according to an embodiment of the disclosure.

Specifically, FIG. 9 is an exemplary image showing a correction result of a 700-th image frame of the original image sequence with non-uniformity according to an embodiment of the disclosure.

In step 12, it is determined whether the current image frame is the last image frame of the original image sequence with non-uniformity, if it is the last image frame, proceed to step (13), and if it is not the last image frame, proceed to step (5).

In step 13, the non-uniformity correction of the original image sequence with non-uniformity is completed.

According to the non-uniformity correction method for an infrared image based on guided filtering and high-pass filtering, firstly, the low-frequency component of the original image is obtained through the guided filtering; then the low-frequency component of the original image is subtracted from the original image to obtain the high-frequency component of the original image; the motion region and the static region in the original image are determined according to inter-frame difference algorithm; then different time constants are configured for the motion region and the static region to perform temporal high-pass filtering on the high-frequency component of the original image, so that fixed pattern noises having almost no boundaries are obtained; finally, the fixed pattern noise are subtracted from the original image so that non-uniformity correction is achieved.

What described are merely preferable embodiments of the disclosure, and are not intended to limit the disclosure.

The invention claimed is:

1. A non-uniformity correction method for an infrared image based on guided filtering and high-pass filtering, comprising: performing guided filtering on a first image frame of an input original image sequence with non-uniformity to obtain a high-frequency component of the first image frame of the original image sequence, and assigning the high-frequency component of the first image frame of the original image sequence to a first fixed pattern noise $f_1$; successively loading an N-th image frame of the original image sequence with non-uniformity as a current image frame, determining a difference between the current image frame and an (N−1)-th image frame of the original image sequence with non-uniformity to obtain an (N−1)-th differential image frame, and obtaining a relative change amplitude of each image element of the (N−1)-th image frame according to the (N−1)-th differential image frame; and performing high-pass filtering based on a combination of a high-frequency component of the current image frame obtained through guided filtering and the relative change amplitude of each image element of the (N−1)-th image frame to obtain an n-th fixed pattern noise fn, and performing non-uniformity correction on the current image frame according to the n-th fixed pattern noise fn to obtain a correction result of the current image frame, where N>2, n>2, Wherein obtaining the relative change amplitude of each image element of the (N−1)-th image frame according to the (N−1)-th differential image frame comprises: determining the relative change amplitude of each image element of the (N−1)-th image frame according to the following formula:

$$q_{n-1}(i,j) = \frac{d_{n-1}(i,j)}{x_{n-1}(i,j)}$$

where qn−1 (i, j) denotes a relative change amplitude of an image element at row i and column j of the (N−1)-th image frame, dn−1 (i, j) denotes a grey scale value of an image element at row i and column j of the (N−1)-th differential image frame, and xn−1 (i, j) denotes a grey scale value of the image element at row i and column j of the (N−1)-th image frame.

2. The non-uniformity correction method for an infrared image based on guided filtering and high-pass filtering according to claim 1, further comprising: after performing non-uniformity correction on the current image frame according to the n-th fixed pattern noise $f_n$ to obtain the correction result of the current image frame, determining whether the current image frame is the last image frame of the original image sequence with non-uniformity, if it is the last image frame, stopping the correction, and if it is not the last image frame, continuing to correct subsequent image frames.

3. The non-uniformity correction method for an infrared image based on guided filtering and high-pass filtering according to claim 2, wherein performing guided filtering on the first image frame of the input original image sequence with non-uniformity to obtain the high-frequency component of the first image frame of the original image sequence, and assigning the high-frequency component of the first image frame of the original image sequence to the first fixed pattern noise $f_1$ are implemented through steps of:

(101) reading the first image frame of the original image sequence with non-uniformity;

(102) performing guided filtering on the first image frame of the original image sequence with non-uniformity to obtain a low-frequency component of the first image frame of the original image sequence;

(103) subtracting the low-frequency component of the first image frame of the original image sequence from the first image frame of the original image sequence with non-uniformity to obtain the high-frequency component of the first image frame of the original image sequence; and (104) assigning the high-frequency component of the first image frame of the original image sequence to the first fixed pattern noise $f_1$.

4. The non-uniformity correction method for an infrared image based on and column j of the high-frequency component of the current image frame, $f_{n-1}(i, j)$ denotes a grey scale value of an image element at row i and column j of an (N−1)-the fixed pattern noise, $q_{n-1}(i, j)$ denotes a relative change amplitude of an image element at row i and column j of the (N−1)-th image frame, Th denotes a threshold value with 0.1≤Th≤0.3.

5. The non-uniformity correction method for an infrared image based on guided filtering and high-pass filtering according to claim 4, wherein obtaining the relative change amplitude of each image element of the (N−1)-th image frame according to the (N−1)-th differential image frame comprises: determining the relative change amplitude of each image element of the (N−1)-th image frame according to the following formula:

$$q_{n-1}(i,j) = \frac{d_{n-1}(i,j)}{x_{n-1}(i,j)}$$

where $q_{n-1}(i, j)$ denotes a relative change amplitude of an image element at row i and column j of the (N−1)-th image frame, $d_{n-1}(i, j)$ denotes a grey scale value of an image element at row i and column j of the (N−1)-th differential image frame, and $x_{n-1}(i, j)$ denotes a grey scale value of the image element at row i and column j of the (N−1)-th image frame.

6. The non-uniformity correction method for an infrared image based on guided filtering and high-pass filtering according to claim 5, wherein performing high-pass filtering based on the combination of the high-frequency component of the current image frame obtained through guided filtering and the relative change amplitude of each image element of the (N−1)-th image frame to obtain the n-th fixed pattern noise $f_n$ comprises: determining the n-th fixed pattern noise $f_n$ according to the following formula:

$$f_n(i,j) = \begin{cases} \frac{1}{M_{min}}x_H^n(i,j) + \left(1 - \frac{1}{M_{min}}\right)f_{n-1}(i,j), & (q_{n-1}(i,j) > Th) \\ \frac{1}{M_{max}}x_H^n(i,j) + \left(1 - \frac{1}{M_{max}}\right)f_{n-1}(i,j), & (q_{n-1}(i,j) < Th) \end{cases}$$

where $f_n(i, j)$ denotes a grey scale value of an image element at row i and column j of the n-th fixed pattern noise $f_n$, $M_{min}$ denotes a relatively small time constant of temporal high-pass filtering, $M_{max}$ denotes a relatively great time constant of temporal high-pass filtering, $x_H^n(i, j)$ denotes a grey scale value of an image element at row i and column j of the high-frequency component of the current image frame, $f_{n-1}(i, j)$ denotes a grey scale value of an image element at row i and column j of an (N−1)-the fixed pattern noise, $q_{n-1}(i, j)$ denotes a relative change amplitude of an image element at row i and column j of the (N−1)-th image frame, Th denotes a threshold value with 0.1≤Th≤0.3.

7. The non-uniformity correction method for an infrared image based on guided filtering and high-pass filtering according to claim 6, wherein performing non-uniformity correction on the current image frame according to the n-th fixed pattern noise $f_n$ to obtain the correction result of the current image frame comprises: performing non-uniformity correction on the current image frame according to $y_n = I_n - f_n$ to obtain the correction result of the current image frame, where $y_n$ denotes the correction result of the current image frame, $I_n$ denotes the current image frame, and $f_n$ denotes the n-th fixed pattern noise with n≥2.

8. The non-uniformity correction method for an infrared image based on guided filtering and high-pass filtering according to claim 7, wherein performing guided filtering on the first image frame of the original image sequence with non-uniformity and performing guided filtering on the current image frame are implemented through steps of:

(301) determining a guided filtering multiplicative parameter $a_k$ and a guided filtering additive parameter $b_k$ according to the following formulas:

$$a_k = \frac{\frac{1}{|w|}\sum_{z \in w_k} I_z p_z - u_k \overline{p}_k}{\sigma_k^2 + \varepsilon}$$

$$b_k = \overline{p}_k - a_k u_k$$

where $w_k$ denotes a window centering on a k-th image element, $|w|$ is a total number of image elements in $w_k$, z denotes a sequence number of an image element in $w_k$, $I_z$ denotes a grey scale value of a z-th image element in an original image, $p_z$ denotes a grey scale value of a z-th image element in a guided image, $u_k$ and $\sigma_k$ respectively denotes an average value and a standard deviation of the original image in $w_k$, $\overline{p}_k$ is an average value of p in $w_k$, $\varepsilon$ is a very small positive number that is equal to 0.01;

(302) determining an average value $\overline{a}_z$ of the guided filtering multiplicative parameter and an average value $\overline{b}_z$ of the guided filtering additive parameter according to the following formulas:

$$\overline{a}_z = \frac{1}{|w|}\sum_{k \in w_z} a_k$$

$$\overline{b}_z = \frac{1}{|w|}\sum_{k \in w_z} b_k;$$

(303) determining an image $x_L$ subjected to guided filtering according to the following formula:

$$x_L = \overline{a}_z I_z + \overline{b}_z.$$

9. The non-uniformity correction method for an infrared image based on guided filtering and high-pass filtering according to claim 1, wherein performing guided filtering on the first image frame of the input original image sequence with non-uniformity to obtain the high-frequency component of the first image frame of the original image sequence, and assigning the high-frequency component of the first image frame of the original image sequence to the first fixed pattern noise $f_1$ are implemented through steps of:

(101) reading the first image frame of the original image sequence with non-uniformity;

(102) performing guided filtering on the first image frame of the original image sequence with non-uniformity to obtain a low-frequency component of the first image frame of the original image sequence;

(103) subtracting the low-frequency component of the first image frame of the original image sequence from the first image frame of the original image sequence with non-uniformity to obtain the high-frequency component of the first image frame of the original image sequence; and (104) assigning the high-frequency component of the first image frame of the original image sequence to the first fixed pattern noise $f_1$.

10. The non-uniformity correction method for an infrared image based on guided filtering and high-pass filtering according to claim 9, wherein successively loading the N-th image frame of the original image sequence with non-uniformity as the current image frame, and determining the difference between the current image frame and the (N−1)-th image frame of the original image sequence with non-uniformity to obtain the (N−1)-th differential image frame are implemented through steps of:

(201) successively loading the N-th image frame of the original image sequence with non-uniformity as the current image frame;

(202) performing guided filtering on the current image frame to obtain a low-frequency component of the current image frame;

(203) subtracting the low-frequency component of the current image frame from the current image frame to obtain the high-frequency component of the current image frame; and (204) calculating a difference between the current image frame and the (N−1)-th image frame as the (N−1)-th differential image frame.

11. The non-uniformity correction method for an infrared image based on guided filtering and high-pass filtering according to claim 10, wherein performing high-pass filtering based on the combination of the high-frequency component of the current image frame obtained through guided filtering and the relative change amplitude of each image element of the (N−1)-th image frame to obtain the n-th fixed pattern noise $f_n$ comprises: determining the n-th fixed pattern noise $f_n$ according to the following formula:

$$f_n(i,j) = \begin{cases} \frac{1}{M_{min}} x_H^n(i,j) + \left(1 - \frac{1}{M_{min}}\right) f_{n-1}(i,j), & (q_{n-1}(i,j) > Th) \\ \frac{1}{M_{max}} x_H^n(i,j) + \left(1 - \frac{1}{M_{max}}\right) f_{n-1}(i,j), & (q_{n-1}(i,j) < Th) \end{cases}$$

where $f_n(i,j)$ denotes a grey scale value of an image element at row i and column j of the n-th fixed pattern noise $f_n$, $M_{min}$ denotes a relatively small time constant of temporal high-pass filtering, $M_{max}$ denotes a relatively great time constant of temporal high-pass filtering, $x_H^n(i,j)$ denotes a grey scale value of an image element at row i (302) determining an average value $\overline{a}_z$ of the guided filtering multiplicative parameter and an average value $\overline{b}_z$ of the guided filtering additive parameter according to the following formulas:

$$\overline{a}_z = \frac{1}{|w|}\sum_{k \in w_z} a_k$$

$$\overline{b}_z = \frac{1}{|w|}\sum_{k \in w_z} b_k;$$

(303) determining an image $x_L$ subjected to guided filtering according to the following formula:

$$x_L = \overline{a}_z I_z + \overline{b}_z.$$

12. The non-uniformity correction method for an infrared image based on guided filtering and high-pass filtering according to claim 11, wherein performing non-uniformity correction on the current image frame according to the n-th fixed pattern noise $f_n$ to obtain the correction result of the current image frame comprises: performing non-uniformity correction on the current image frame according to $y_n=I_n-f_n$ to obtain the correction result of the current image frame, where $y_n$ denotes the correction result of the current image frame, $I_n$ denotes the current image frame, and $f_n$ denotes the n-th fixed pattern noise with $n \geq 2$.

13. The non-uniformity correction method for an infrared image based on guided filtering and high-pass filtering according to claim 12, wherein performing guided filtering on the first image frame of the original image sequence with non-uniformity and performing guided filtering on the current image frame are implemented through steps of:

(301) determining a guided filtering multiplicative parameter $a_k$ and a guided filtering additive parameter $b_k$ according to the following formulas:

$$a_k = \frac{\frac{1}{|w|}\sum_{z \in w_k} I_z p_z - u_k \overline{p}_k}{\sigma_k^2 + \varepsilon}$$

$$b_k = \overline{p}_k - a_k u_k$$

where $w_k$ denotes a window centering on a k-th image element, $|w|$ is a total number of image elements in $w_k$, z denotes a sequence number of an image element in $w_k$, $I_z$ denotes a grey scale value of a z-th image element in an original image, $p_z$ denotes a grey scale value of a z-th image element in a guided image, $u_k$ and $\sigma_k$ respectively denotes an average value and a standard deviation of the original image in $w_k$, $\overline{p}_k$ is an average value of p in $w_k$, $\varepsilon$ is a very small positive number that is equal to 0.01;

guided filtering and high-pass filtering according to claim 3, wherein successively loading the N-th image frame of the original image sequence with non-uniformity as the current image frame, and determining the difference between the current image frame and the (N-1)-th image frame of the original image sequence with non-uniformity to obtain the (N-1)-th differential image frame are implemented through steps of:

(201) successively loading the N-th image frame of the original image sequence with non-uniformity as the current image frame;

(202) performing guided filtering on the current image frame to obtain a low-frequency component of the current image frame;

(203) subtracting the low-frequency component of the current image frame from the current image frame to obtain the high-frequency component of the current image frame; and (204) calculating a difference between the current image frame and the (N-1)-th image frame as the (N-1)-th differential image frame.

* * * * *